Patented Oct. 7, 1952

2,613,215

UNITED STATES PATENT OFFICE 2,613,215

TREATMENT OF GLYCERIDE OILS

Karl F. Mattil, Chicago, Ill., assignor to Swift & Company, Chicago, Ill., a corporation of Illinois No Drawing. Application August 6, 1947, Serial No. 766,859

4 Claims. (Cl. 260—409)

The present invention relates to the treatment of glyceride oils. More particularly, the invention has to do with a process of improving the flavor and odor stability of glyceride oils, particularly of vegetable and fish origin.

A major problem of the edible oil industry receiving the constant attention of workers in the field is the tendency of refined unsaturated glyceride oils to undergo undesirable flavor and odor changes on standing. Soybean oil, for example, although subjected to a drastic steam deodorization treatment to remove volatile malodorous materials, takes on a characteristic "grassy" or "painty" flavor and odor, known as "reversion." Because of reversion, the use of the so-called reverting oils in edible products is objectionable, and for this reason such oils are at a serious economic disadvantage when compared with relatively stable oils, such as cottonseed oil.

Various theories have been proposed to explain the nature of reversion, and many solutions of overcoming the problem of reversion have accordingly been described. It has been thought, for example, that reversion is due to the presence in the oil of certain unsaponifiable substances thought to be the precursors of reversion, while according to another theory, reversion is inherent in the nature of the structure of the glyceride molecule. The proposed solutions to the problem of reversion have met with little success, and therefore the use of reverting oils in edible products is discouraged.

An object of the invention is to improve the flavor and odor stability of unsaturated glyceride oils.

Another object of the invention is to improve the stability of the so-called reverting oils, whereby the oils may be used for edible purposes.

Other objects and advantages of the invention will be apparent from the description of the invention which follows.

The present invention is based on the discovery that reversion in an oil, such as soybean, is due to the presence of certain reversion precursor substances found in the unsaponifiable portion of the oil, and that the manner of removal of these substances has an important bearing on the quality of the final product. I have found that in order to produce an oil of improved stability, it is necessary to subject the oil to a preliminary treatment of hydrogenation prior to the removal of the unsaponifiable material. The hydrogenation step seems to affect a reverting oil in such manner as to permit a more complete removal of the unsaponifiable material containing reversion precursor substances from the oil, or otherwise so affect it as to produce unexpectedly superior results of stability hitherto unattainable. The term "unsaponifiable material" is meant to include carotenoids, phosphatides, tocopherols, sterols, etc. In separating this fraction from the oil, the free fatty acids are also removed with the aforesaid materials.

In accordance with the invention, refined, hydrogenated oil is treated for the selective removal of the unsaponifiable fraction. Following the removal of the unsaponifiable fraction from the hydrogenated oil, the oil is advantageously subjected to a deodorization treatment. Although the deodorization step may be included in the refining operation, it is preferred to deodorize the oil following the removal of the unsaponifiable fraction therefrom. It has been found that the resulting oil is relatively non-reverting and may advantageously be used in the preparation of food products.

The operation of refining may be carried out in accordance with conventional refining methods of alkali treatment, preferably followed by a bleaching operation included as a part of the refining process. Refining may also be accomplished by subjecting the crude oil to the action of a liquefied normally gaseous hydrocarbon solvent, such as propane, under such conditions as to effect the removal of the undesirable impurities, including gums, resins, and color bodies, as is shown, for example in Patent 2,288,441 to Ewing.

In practicing the invention, the degree of hydrogenation of the refined oil is not critical and may vary over a wide range, the extent of hydrogenation depending on the type of final product desired. Thus, the oil may be subjected to a hydrogenation treatment yielding a final product which is solid at room temperatures, or the oil may be only slightly hydrogenated to give a final product having an iodine value only slightly lower than the original oil.

For most purposes it is desirable that the final non-reverting product be liquid. In order to accomplish this result, we have found that hydrogenating the refined oil to the extent of reducing the iodine value thereof about 4 to 20 points makes possible the production of an oil which physically does not differ substantially from the original oil, but which oil, after the removal of the non-saponifiable material, is substantially more stable.

A preferred method of removing the unsaponifiable material from the hydrogenated oil involves high temperature fractionation with a liquefied normally gaseous hydrocarbon solvent, such as propane, under conditions such as to selectively dissolve the unsaponifiable substances in a fraction which is removed from a major proportion of the oil. This method of operation is based on the principle of decreasing solvent action with increasing temperature shown by a liquefied normally gaseous hydrocarbon solvent, such as propane, so that at the critical temperature of the solvent, the solvent effects thereof are at a minimum. By suitable manipulation of temperature and pressure to maintain the solvent in the liquid state, and solvent to oil ratio, a liquid-liquid phase separation may be effected whereby the different materials of the oil may be caused to appear in one or the other phase, depending on the solubility characteristics of the materials. The unsaponifiable portion of glyceride oils is more soluble in propane than the main body composed of the glycerides. Therefore, by careful control of the temperature and amount of solvent, the difference in solubility between the glycerides and the unsaponifiable portion of the oil may be utilized in a fractionation operation, wherein the unsaponifiable portion of the oil may be extracted from the main body thereof to form a solution with a major portion of the solvent appearing in one fraction, while leaving most of the oil undissolved in another fraction.

In effecting the removal of the unsaponifiable material from the refined and hydrogenated oil by means of propane, the oil is charged together with the appropriate amount of solvent to a fractionating tower, preferably the solvent at one point and the oil at another, maintained under such conditions as to cause the formation of two phases, a top phase containing a majority of the solvent and the unsaponifiable portion of the oil dissolved therein, and a bottom phase containing most of the oil free of unsaponifiable material. The two phases are then separated.

The fractionating tower may be either unpacked or packed, such as with Raschig rings or Berl saddles. Conditions in the tower are so maintained as to effect as complete a separation of the unsaponifiable material from the oil as possible. An overhead fraction, or cut, amounting to about 3 to 10 per cent of the charged oil, will in most cases contain substantially all of the non-saponifiable material present in the oil. In order to accomplish this result, temperatures between about 190° F. and 205° F. near the critical point of the solvent, pressures of about 570 to 650 pounds per square inch, and a solvent to oil ratio of 20 to 30 to 1, have been found satisfactory.

Although propane is the preferred solvent, other normally gaseous hydrocarbon solvents, such as ethylene, ethane, propylene, butane, isobutane, butylene and mixtures of these may be employed.

According to another method of operating, the removal of the unsaponifiable portion from the treated oil may be accomplished by a fractionation of the hydrogenated oil with an organic polar solvent or a mixture of a number of polar solvents, such as ethanol or methanol, whereby there occurs a separation of the oil into fractions. Fractionation conditions are such that one of the fractions contains preferentially dissolved therein the unsaponifiable material and the other fraction, the major portion of oil substantially immiscible in the solvent. The amount of solvent and the extraction temperature employed may vary widely, depending on the material being treated and the amount of material desired to be extracted. Thus, extraction temperatures may vary from 80 to 160° F., and the solvent to oil ratio, from 1 to 10 to 1. Employing these operating conditions, a separation of the oil into two fractions occurs, one of which, amounting to about 1 to 10 per cent of the charged oil, contains the unsaponifiable fraction of the treated oil miscible with the solvent, and the other contains the glyceride portion of the oil in a small proportion of the organic solvent.

As the temperature increases, the solvent action of the solvent also increases. By controlling the solvent to oil ratio and the temperatures, the size of the fractions may be controlled as desired. In most cases the solvent to oil ratio varying from about 2 to 4 to 1 is satisfactory. To produce the desired degree of fractionation, the temperature is varied on the basis of a predetermination of the unsaponifiable material content and, therefore, according to the size of the fractions desired. Thus, we may begin with a solvent to oil ratio of 2 to 1 at the lower temperature limit of about 80° F. At this temperature the amount of material preferentially dissolved by the solvent is small; by raising the temperature we may control the amount of solute to the desired extent.

A wide variety of organic polar solvents may be employed in carrying out the invention. Examples of suitable solvents are alcohols, such as methyl, ethyl, and propyl alcohols, propylene glycol, and glycerine; aldehydes, such as acetaldehyde, propionaldehyde, and water-saturated furfural; ketones, such as acetone; esters, such as methyl formate, methyl salicylate, methyl levulinilate, methyl oxalate, methyl lactate, and glycol diacetate.

The liquid-liquid extraction of the hydrogenated oil by means of polar solvents may be effected by continuous countercurrent extraction, as in a tower; multiple stage countercurrent extraction involving mixing and settling; or one or more stages of batch extraction, involving mixing and settling, all known in the art.

In another embodiment of the invention the unsaponifiable material may be removed from the hydrogenated oil by contacting the oil with a solid adsorbent agent which is capable of adsorbing on its surface substantially all of the unsaponifiable fraction of the hydrogenated oil, which may then be separated from the main body of the oil.

The amount of adsorbent agent employed will vary with the quality of the oil being treated and the quantity of the material desired to be selectively removed by adsorption from the oil. As a general rule, the quantity of the material adsorbed, that is, the adsorbate, will amount to about 3 to 20 per cent of the oil being treated, larger amounts usually being required to be removed from inferior oils.

In order to effect a removal of as much as 20 per cent of the oil by adsorption, the adsorbent agent should be one capable of holding a relatively large amount of adsorbate. Moreover, the particles of the adsorbent substance should not be porous and should show high selectivity for closely related chemical substances. Amounts of adsorbent in excess of 50 per cent, based on the oil, are generally employed, amounts as high as 80 per cent being not uncommon.

In practicing the invention using an adsorbent material, it is preferred to effect the removal of the unsaponifiable fraction from the hydrogenated oil by allowing the oil to percolate over the adsorbent material in a column. The process may be facilitated by passing a solution of the oil through the percolation column. Suitable solvents for effecting such a solution are the non-polar solvents, such as the hydrocarbons petroleum ether and hexane. Following the percolation of the oil through the column of adsorbent agent, the recovered oil may then be treated for the removal of the solvent therefrom.

In place of a column, adsorption of the unsaponifiable matter may be carried out by mixing and agitating the adsorbent and oil, with or without solvent, in a suitable mixing apparatus, followed by separation of the unadsorbed oil from the adsorbent substance by means of a filter or centrifuge.

Examples of suitable adsorbent substances are alkaline earth oxides, hydroxides, and salts, such as carbonates and sulfates; talc; silica; soda ash, and various silicates; fuller's earth, and activated charcoals.

It is pointed out that certain of the aforesaid agents are employed in conventional bleaching operations of fats and oils in amounts of about 1 to 2 per cent. As used in accordance with the present invention, these materials are employed under such conditions as to remove not only the color bodies, but also the other unsaponifiable materials hereinabove defined. For this reason it is preferred to use those adsorbents which are recognized in the art as having strong adsorbing action, such as high power clays, silica gel, and acid-treated clays, and under such conditions as to remove substantially all of the non-saponifiable matter from the oil.

Hydrogenation of the oil prior to the removal of the unsaponifiable matter may be carried out in a conventional hydrogenator, and conditions maintained therein may vary widely, depending on the degree of hydrogenation desired. A temperature between about 200° F. and 400° F. and a pressure from zero to 50 pounds per square inch gauge with an amount of nickel catalyst ranging from about 0.02 to 0.05 per cent have been satisfactory in effecting a drop in the iodine of about 4 to 20 points.

Satisfactory deodorization of the treated oil has also been accomplished in conventional deodorization equipment. Temperatures between about 350° F. and 500° F., and pressures between about 5 and 10 mm. absolute pressure have been found suitable.

While soybean oil has been mentioned as a typical oil falling within the scope of the invention, other unsaturated oils of vegetable, fish and animal origin are contemplated by the invention. Examples of these oils, in addition to soybean, are the vegetable oils, such as linseed, rapeseed, mustard seed, corn, perilla; the fish oils, such as sardine and menhaden; the animal oils, such as oleo stock, oleo oil, and lard oil.

The following examples illustrate the operation of the invention. The improvement obtained by treating the oil in accordance with the invention was determined by comparing the odor and flavor characteristics of the treated hydrogenated oil with samples of the untreated unhydrogenated oil, and with samples of treated unhydrogenated oil. The samples are referred to in the tables as "hydrogenated," "control" and "unhydrogenated," respectively. The stability of the various samples was determined by holding the samples at 95° F. in a dark room and noting the elapsed time before the reversion characteristics of odor and flavor could be detected in the samples. All three samples were deodorized before testing.

*Example 1*

A quantity of refined soybean oil having 1.6 per cent of unsaponifiable matter, a free fatty acid content of 0.5 per cent, and an iodine value of 132 was charged to a hydrogenator. In the hydrogenator the oil was maintained at a temperature of about 300° F. and under a pressure of about 35 pounds per square inch gauge and in the presence of 0.02 per cent nickel catalyst. Under these operating conditions the iodine value of the oil was reduced from 132 to 127. The oil was allowed to cool and was then separated from the solid catalyst. The oil was charged to the upper portion of a fractionating column. Simultaneously with the introduction of the oil liquefied propane was introduced in the lower portion of the column in the ratio of about 20 volumes of propane to one of oil. The mixture in the column was maintained at 200° F. under a pressure of 625 pounds per square inch to maintain the solvent in the liquid condition. Under these operating conditions an overhead fraction amounting to about 4 per cent of the charged oil, and a bottom fraction containing a lesser proportion of the solvent, and the remainder of the oil were obtained. The bottom fraction, after removal of the solvent, was deodorized in a deodorizer maintained at 450° F. and at a pressure of 6 mm. absolute. The deodorized oil had a free fatty acid content of 0.02 per cent and an iodine value of 130. The following data were obtained as a result of the stability test described above:

|  | Hydrogenated | Unhydrogenated | Control |
|---|---|---|---|
| Days before reverted odor detected | 18 | 7 | 5 |
| Days before reverted flavor detected | 15 | 6 | 4 |

*Example 2*

A sardine oil having an unsaponifiable fraction of 1 per cent, a free fatty acid content of 1 per cent, and an iodine value of 180 was subjected to a hydrogenation treatment in a hydrogenator in the presence of 0.03 per cent nickel catalyst at a temperature of 350° F. and a pressure of 30 pounds per square inch gauge. In about one-half hour the iodine value dropped to 165. The hydrogenated oil was separated from the catalyst and charged to a fractionating column into which was introduced liquefied propane in the ratio of 30 volumes of propane to 1 volume of oil. The temperature in the fractionator was maintained at 195° F. and the pressure at 595 pounds per square inch. A liquid-liquid phase separation occurred in which the top phase containing substantially all of the unsaponifiable material in a major proportion of the solvent, and a bottom phase containing the remainder of the oil in very little solvent, were obtained. The phases were separated and the solvent was stripped from the bottom fraction, after which the oil was deodorized in a deodorizer at a temperature of 200° F. and a pressure of 8 mm. absolute. The resulting oil had an iodine value of 169 and a free fatty acid content of 0.03 per cent. This oil was then compared for stability with samples of deodorized sardine oil as hereinabove described:

|  | Hydrogenated | Unhydrogenated | Control |
|---|---|---|---|
| Days before reverted odor detected | 9 | 2 | 0 |
| Days before reverted flavor detected | 8 | 1 | 0 |

Example 3

A batch of corn oil having 1.8 per cent unsaponifiable matter, a free fatty acid content of 2.3 per cent, and an iodine value of 125 was hydrogenated at 350° F. and 5 pounds per square inch pressure in the presence of 0.03 per cent nickel catalyst. The iodine value was reduced to 115. The oil was separated from the solid catalyst and charged to a fractionating column, together with liquefied propane, in the ratio of 30 volumes of propane to one of oil. The temperature in the fractionating column was maintained at 170° F. and a pressure of 560 pounds per square inch to maintain the solvent in the liquid condition. Under these operating conditions a 10 per cent overhead fraction was obtained and was separated from the bottom fraction. After deodorization the oil recovered from the bottom fraction had an iodine value of 119 and a free fatty acid content of .05 per cent. The data obtained were as follows:

|  | Hydrogenated | Unhydrogenated | Control |
| --- | --- | --- | --- |
| Days before reverted odor detected | 14 | 6 | 6 |
| Days before reverted flavor detected | 12 | 5 | 4 |

Example 4

4 kilograms of refined and bleached soybean oil having an iodine value of 130 was hydrogenated to an iodine value of 115. The hydrogenated oil was mixed with 10 liters of petroleum ether and the resulting solution put through a specially prepared filter column of activated alumina. A percolate amounting to 80 per cent of the oil, and having a color of 5Y and 0.3R on the Lovibond scale, was obtained. A sample of refined and bleached soybean oil obtained from the same batch as the first sample was also put through a similar percolation column. The yield was 80 per cent and the color of the oil was 14Y and 0.9R.

Following deodorization the two samples were stored at 95° F. in a dark room and tested periodically for odor and flavor. The following data were obtained.

|  | Hydrogenated | Unhydrogenated | Control |
| --- | --- | --- | --- |
| Days before reverted odor detected | 17 | 8 | 6 |
| Days before reverted flavor detected | 16 | 7 | 6 |

Example 5

Another batch of soybean oil having an iodine value of 134 was hydrogenated to the extent of dropping the iodine value of the oil to 127. The adsorption treatment was the same as that described in Example 4. The following data were obtained:

|  | Hydrogenated | Unhydrogenated | Control |
| --- | --- | --- | --- |
| Days before reverted odor detected | 19 | 10 | 7 |
| Days before reverted flavor detected | 17 | 9 | 7 |

Example 6

A quantity of alkali refined soybean oil having an iodine value of 130, a free fatty acid content of 0.5 per cent, and 4 per cent of unsaponifiable matter was treated in a hydrogenator until the iodine value was reduced to 121. The hydrogenated oil was subjected to a countercurrent extraction treatment with ethyl alcohol in the ratio of 2 volumes of alcohol to one of oil at 100° F. The extract amounted to about 3 per cent of the charged oil and contained substantially all of the unsaponifiable matter and the free fatty acids. The resulting oil was then compared with two samples of the same batch of soybean oil as hereinabove described:

|  | Hydrogenated | Unhydrogenated | Control |
| --- | --- | --- | --- |
| Days before reverted odor detected | 10 | 5 | 5 |
| Days before reverted flavor detected | 9 | 5 | 5 |

Example 7

A quantity of menhaden oil hardened from 180 to 140 was subjected to a countercurrent extraction treatment with methyl formate in a ratio of 3 to 1 and at a temperature of 110° F. The extract amounted to 4 per cent of the charged oil and contained substantially all of the unsaponifiable matter and the free fatty acids. The main body of the oil, after removal of the solvent, was deodorized and compared for stability as hereinabove described:

|  | Hydrogenated | Unhydrogenated | Control |
| --- | --- | --- | --- |
| Days before reverted odor detected | 4 | 0 | 0 |
| Days before reverted flavor detected | 3 | 0 | 0 |

Obviously, many modifications and variations of the invention, as hereinbefore set forth, may be made without departing from the spirit and scope thereof, and therefore only such limitations should be imposed as are indicated in the appended claims.

I claim:

1. The process of producing a relatively non-reverting glyceride oil from a reverting glyceride oil, which comprises hydrogenating said reverting oil containing unsaponifiable matter to reduce the iodine value of the said oil by about 4 to 20 points, subjecting the partially hydrogenated oil containing the unsaponifiable fraction in an unoxidized state to a fractionation operation in the presence of a liquefied normally gaseous hydrocarbon solvent under temperature conditions whereby the resulting solution separates into two phases, one phase being rich in unoxidized unsaponifiable matter and another phase being relatively rich in nonreverting glyceride oil, and separating said phases.

2. The process of producing an improved edible glyceride oil product from a reverting glyceride oil, which comprises subjecting said reverting oil containing unsaponifiable matter to a hydrogenation treatment to reduce the iodine value of the said oil by about 4 to 20 points, charging the hydrogenated oil containing the unsaponifiable fraction in an unoxidized state to a fractionation tower, and in the presence of a liquefied normally gaseous hydrocarbon subjecting said hydrogenated oil containing the unoxidized unsaponifiable matter to temperatures below the critical point of the liquefied hydrocarbon solvent whereby the fractionation of the oil into two phases is effected, and separating the phases, one of which is rich in improved reversion resisting glyceride oil.

3. The process of producing a more stable glyceride oil from a reverting glyceride oil, which comprises treating a reverting glyceride oil with hydrogen to subject the glyceride oil containing unsaponifiable matter therein to hydrogenation until the iodine value of the hydrogenated oil has been reduced at least between 4 and 20 points, and thereafter removing the unsaponifiable matter in an unoxidized state from the treated oil by means of the selective solvent action of a liquefied normally gaseous hydrocarbon to produce a glyceride oil resistant to flavor and ordor reversion.

4. The process as described in claim 3 wherein the liquefied normally gaseous hydrocarbon is propane.

KARL F. MATTIL.

REFERENCES CITED

The following references are of record in the file of this patent:

UNITED STATES PATENTS

| Number | Name | Date |
| --- | --- | --- |
| 1,152,023 | Joslin | Aug. 31, 1915 |
| 1,224,291 | Ellis | May 1, 1917 |
| 1,242,624 | Whittaker | Oct. 9, 1917 |
| 1,383,887 | Wells | July 5, 1921 |
| 1,974,542 | Parkhurst et al. | Sept. 25, 1934 |
| 2,118,454 | Schaafsma | May 24, 1938 |
| 2,308,848 | Young et al. | Jan. 19, 1943 |